United States Patent [19]

De Angelis et al.

[11] Patent Number: 4,715,458

[45] Date of Patent: Dec. 29, 1987

[54] BEAM BALANCE WITH UNEQUAL ARMS AND DIDDER DEVICE

[75] Inventors: Pedro C. De Angelis; Nedo D. L. Dragicevic, both of Cochabamba, Bolivia

[73] Assignee: Darko Jorge Lazaneo Dragicevic, Cochabamba, Bolivia

[21] Appl. No.: 884,810

[22] Filed: Jul. 11, 1986

[51] Int. Cl.⁴ ............... G01G 23/14; G01G 3/14; G01G 1/18

[52] U.S. Cl. .................. 177/172; 177/210 R; 177/251

[58] Field of Search ............ 177/172, 246, 251, 210 R

[56] References Cited

U.S. PATENT DOCUMENTS

| | | | |
|---|---|---|---|
| 2,626,796 | 1/1953 | Seederer et al. | 177/172 |
| 3,587,762 | 6/1971 | Ast | 177/246 X |
| 3,590,932 | 7/1971 | Dybwad | 177/210 R |
| 3,753,472 | 8/1973 | Dybwad et al. | 177/210 R |
| 3,926,270 | 12/1975 | Meier | 177/172 X |

Primary Examiner—George H. Miller, Jr.
Attorney, Agent, or Firm—Millen & White

[57] ABSTRACT

The sensitivity of a balance beam having unequal arms used to detect and measure phenomenon which exert low energy mechanical forces includes a U-shaped beam area having a horizontal slot therein and a pivot post having a vertical slot which registers with the horizontal slot. A fastener, such as screw and wing-nut passes through the slots to releasably fix the pivot post to the fulcrum area in a selected horizontal and vertical position. The selected position is the optimum point of equilibrium of the beam that is determined when the horizontal fulcrum's bottom knife edge passes through center of gravity of the beam. Pivot post has a blade thereon which extends perpendicular to the balance beam and rests on a pair of fulcrum supports. The fulcrum supports are vibrated by a didder device to enhance sensitivity of the balance beam.

7 Claims, 5 Drawing Figures

BEAM BALANCE WITH UNEQUAL ARMS AND DIDDER DEVICE

BACKGROUND OF THE INVENTION

(1) Field of the Invention

The instant invention relates to balance beams, and more particularly, the instant invention relates to mechanical balance beams which may optionally utilize a didder device and to find and register its own center of gravity.

(2) Technical Considerations and Prior Art

Balance beams are of course old and well-known devices which have been used for centuries to weight items both for commercial and scientific purposes. Generally, laboratory beams utilize an equal arm device wherein the sample or item to be weighed is balanced with weights of known quantities. These types of beams are very sensitive but are not readily adaptable to situations where one is attempting to measure or detect minute mechanical forces. Such forces may be generated by beams of electromagnetic particles such as light beams or other low energy particle beams. Moreover, the detection of fluid streams such as low energy gas streams can be exceedingly difficult to measure and detect with currently used technology. There are on the market electrical balances, however, these types of balances tend at times to be insensitive and unstable and are not suitable for measuring minute mechaninal forces.

SUMMARY OF THE INVENTION

The foregoing considerations in mind, the instant invention contemplates a balance beam having support structure defining a balance line which uniquely engages a fulcrum to provide a very sensitive balance device by means of finding and registering its own center of gravity. More particularly, the instant invention contemplates a balance beam have a fulcrum engaging area including a U-shaped projection in the beam, the U-shaped projection having a horizontally extending bite portion and being joined to the beam by a pair of parallel legs. The horizontal extending bite portion has a horizontally extending slot therein to which slot is connected a vertically extending pivot post. The vertically extending pivot post has a vertically extending slot therein and is held in fixed relation with respect to the horizontal slot in the bite member by a releasable screw means. The pivot post has a pivot edge which variable for both vertically and horizontally adjustability with respect to the beam which it supports.

The pivot post engages a fulcrum having a bottom knife edge which can coincide with center of gravity of systems, and register it so as to make its beam more sensitive. Moreover, the fulcrum is continuously vibrated by a didder device while measurement or detection experiments or procedures are taking place.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein.

THE PREFERRED EMBODIMENT

Figure 1:
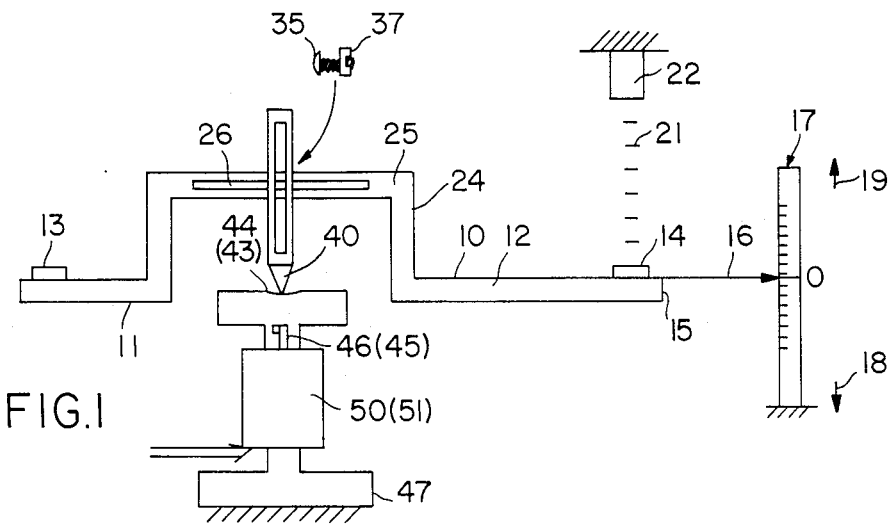
FIG. 1 is a side-view of a balance beam apparatus in accordance with the instant invention.
Figure 2:
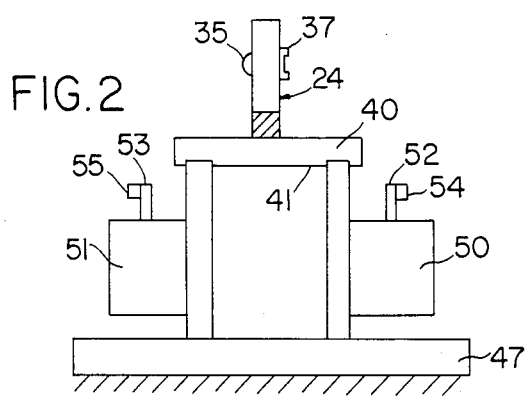
FIG. 2 is an end-view of a didder device configured in accordance with the principles of the instant invention.
Figure 3:
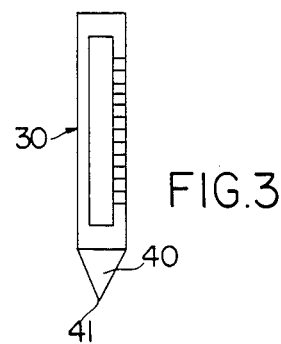
FIG. 3 is a view of a pivot post showing the vertical slot, a scale and balance line.
Figure 4:
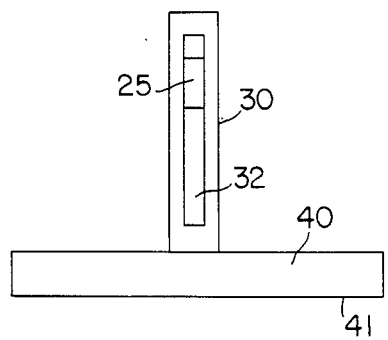
FIG. 4 is a side-view of the pivot post with fulcrum attached thereto shown in FIG. 3.
Figure 5:
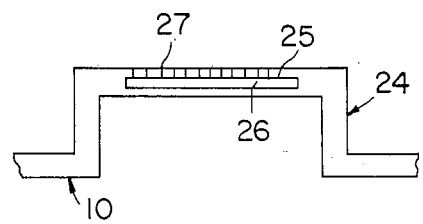
FIG. 5 is a view of the U-shaped support area of the balance beam showing a scale thereon.

Referring now to FIG. 1, there is shown a balance beam, designated generally by the numeral 10, configured in accordance with the principles of the instant invention. The balance beam 10 includes two arms 11 and 12. In accordance with one embodiment of the instant invention, the arm 11 may support a tray 13 in which weights may be contained in order to balance the arm 12. The arm 12 may have thereon an area 14 which may, for example, be an area upon which a low energy beam is impinged. Opposite the end 15 of the beam 12 there is a pointer 16 which registers with a scale 17 having a plus direction 18 and a minus direction 19. Impinging on the area 14 is a low energy beam 21 which emitted by a source of the low energy beam 22. The low energy beam 21 may be a beam of electromagnetic radiation, a fluid stream or perhaps a magnetic or some other electromotive force device. For the purposes of this disclosure, it is only necessary that the beam 21 or any force or phenomenon existed or embodied therein mechanically effect the area 14 in such a way to rotate the balance 10 in either the positive or negative direction. If the phenomenon of the beam 21 causes the impingement area 14 to for some reason become lighter, than the balance beam 10 will rotate in the counter-clockwise direction and pointer 16 will move in the direction of arrow 19. If the beam 21 increases the force on the plate 14 so that the increased force is cumulative with the force of gravity, the beam 10 will rotate in a clockwise direction or in the direction of arrow 18.

As is seen in FIG. 1, the balance beam 10 has a U-shaped portion designated generally by the numeral 25. The U-shaped portion 25 is a "fulcrum area" which is readily adjustable in order to finely tune the balance beam 10 and register the systems center of gravity. The U-shaped portion 25 has a horizontal slot 26 therein with a scale 27 adjacent thereto. A pivot post, designated generally by the numeral 30 has a shank portion 31 on the vertical slot 32 therein, which vertical slot 32 is in alignment with the horizontal slot 26 of the bite 25 of the U-shaped portion 24. A screw 35 and wing-nut 37 adjustably fix the pivot post 30 to the bite 25 of the U-shaped portion 24 bypassing through the slot 26 in the bite and the slot 32 in the pivot post. The pivot post 30 has a blade 40 fixed to the bottom thereof which blade 40 has an edge 41. The edge 41 is received and fulcrum grooves 43 and 44 at the top of fulcrum supports 45 and 46 respectively. The fulcrum supports 45 and 46 are secured to a base 47. By loosening the wing-nut 37, the pivot post 30 may be vertically adjusted and horizontally adjusted with respect to the bite 25 of the U-shaped fulcrum area 24. Attached to the fulcrum supports 45 and 46 are vibratory devices 50 and 51 which when energized form the didder device which reduces friction between the edge 41 of the blade 40 and the grooves 43 and 44 in the fulcrum supports. In accordance with one embodiment of the invention, the vibratory devices are simply electrical motors which have shafts 52 and 53, each with an off-center weight 54 and 55, respectively.

Sensitivity may be increased to its optimum point by moving up or down, left or right the pivot post 30 that the horizontal fulcrum is attached to. As center of gravity is reached by the bottom edge 41 of the fulcrum, the equilibrium point that is desired can be determined.

In operation, the beam is balanced by, if necessary, adding weights to the pan 13 or deleting weights from the pan 13 until the pointer 16 is at 0 on the scale 17. Prior to measuring deflection, the didder device consisting of the vibrators 50 and 51 is energized. The measurement of mechanical force from a beam such as the beam 21 is then conducted by energizing the beam 21 or other phenomenon emitted from source 22 in order to deflect the balance beam 10 in either the positive direction 18 or the negative direction 19. Note that the positive direction and negative direction are reversed since this is a balance device in which a decrease of the force exerted by impingement on the area 14 makes the arm 12 move upwardly, whereas an increase in force on the area 14 makes the arm 12 move downwardly.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Apparatus for measuring and detecting minute mechanical forces, such as those crated by the energy of an energy beam, the apparatus comprising:
    (a) a balance beam, the balance beam having a U-shaped portion designating a fulcrum area, the U-shaped portion having a bite with a horizontal slot therein, the balance beam having unequal arms and first and second ends wherein the first end has an area thereon for mounting weights to adjust the attitude of the second end, a force measurement area at the second end, one of the ends having a pointer thereon for registering with the scale in order to designate a zero point and to indicate movement of the end in positive and negative directions; and
    (b) a pivot post having a vertical slot therein and a horizontally extending blade extending in a direction normal to the extent of the balance beam;
    (c) fastening means in registration with the horizontal slot in the bite portion and the vertical slot in the pivot post for fixing releasably the pivot post with respect to the bite of the U-shaped portion;
    (d) fulcrum means for supporting the balance beam, the fulcrum means having support areas engaged by the edge of the blade, and means for vibrating the fulcrum means so as to reduce friction between the blade and areas supporting the blade whereby the sensitivity of the balance is enhanced.

2. The balance of claim 1, wherein there is a scale extending parallel to the horizontal slot in the bite portion of the U-shaped fulcrum area and a scale extending adjacent the vertical slot in the pivot post.

3. The apparatus of claim 2, wherein the vibrating means are motors attached to the fulcrum supports, the motors having unbalanced shafts.

4. The apparatus of claim 2, wherein the vibrating means can be by mechanical, electrical or sonic means.

5. In a balance beam, the improvement comprising:
    (a) a U-shaped fulcrum area wherein the U-shaped fulcrum area includes a bite portion with a horizontal slot therein, the bite portion connected to the beam by a pair of spaced legs;
    (b) a pivot post having a vertical slot therein in registration with the horizontal slot in the bite portion, the pivot post having a fulcrum engaging portion;
    (c) means for releasably attaching the pivot post to the bite, the attaching means extending through the vertical slot in the pivot post and the horizontal slot in the bite portion;
    (d) means to determine center of gravity of beam; and
    (e) fulcrum means defining a supporting surface upon which the fulcrum engaging means rests.

6. The improvement of claim 5, wherein a fulcrum means includes vibratory means for vibrating the area upon which the fulcrum support rests so as to increase sensitivity of the balance beam.

7. The improvement of claim 6, wherein the fulcrum engaging portion of the pivot post is a horizontally extending blade which extends normal to the extent of the balance beam.

* * * * *